Figure 1:
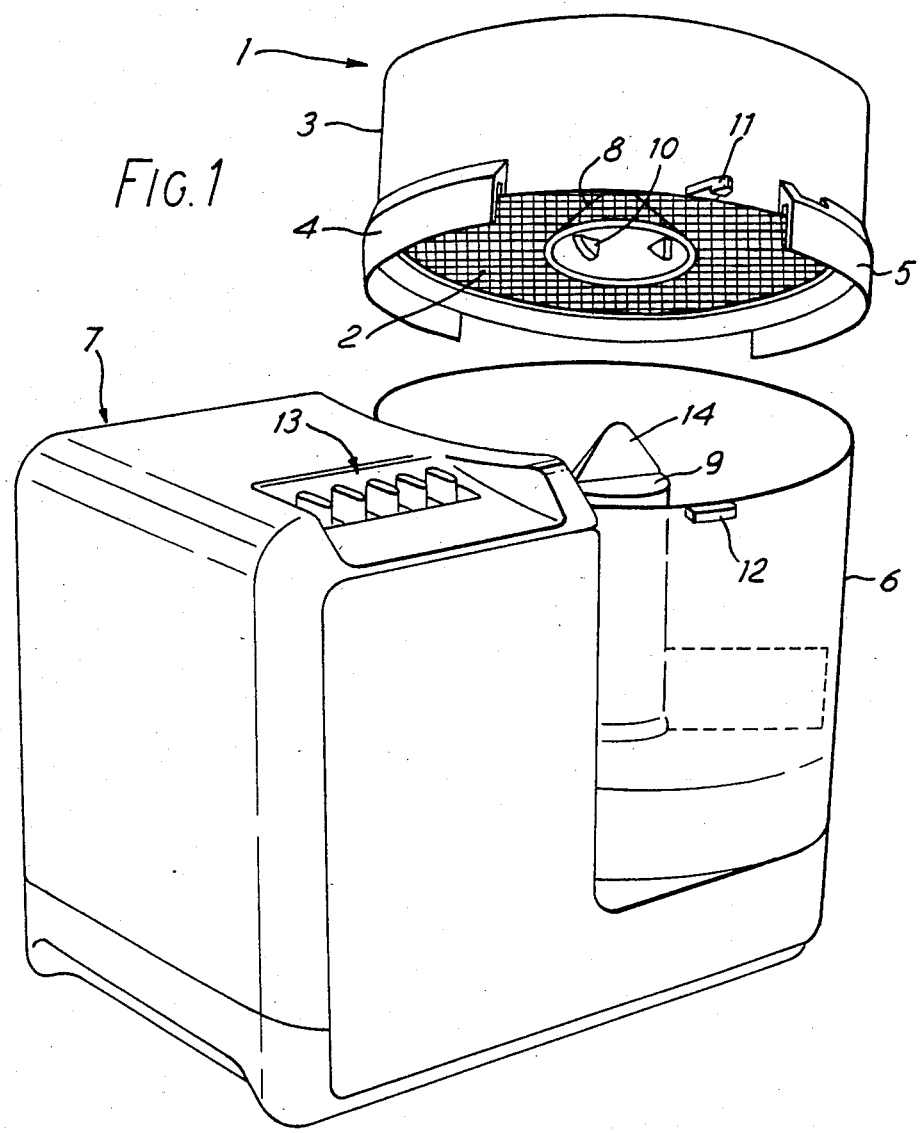

United States Patent [19]

Barnett

[11] Patent Number: 4,598,874
[45] Date of Patent: Jul. 8, 1986

[54] SIFTING DEVICE

[75] Inventor: Edward C. W. Barnett, Hayling Island, England

[73] Assignee: Thorn EMI Domestic Appliances Limited, London, England

[21] Appl. No.: 558,358

[22] Filed: Dec. 5, 1983

[30] Foreign Application Priority Data

Dec. 9, 1982 [GB] United Kingdom ............... 8235130

[51] Int. Cl.$^4$ .................... B02C 1/00; B02C 25/00
[52] U.S. Cl. .................... 241/37.5; 209/235; 209/328; 209/347; 209/374; 241/94
[58] Field of Search .............. 241/94, 92, 37.5, 283, 241/282.1, 282.2; 209/346, 347, 325, 326, 309, 235, 236, 233, 254, 373, 374, 371, 372, 365 R, 365 A, 328

[56] References Cited

U.S. PATENT DOCUMENTS

| | | | |
|---|---|---|---|
| 1,808,426 | 6/1931 | McCormick | 209/328 |
| 1,894,858 | 1/1933 | Fromm | 241/94 X |
| 2,024,978 | 12/1935 | McCormick | 209/374 |
| 2,412,840 | 12/1946 | Snyder | 209/347 |
| 2,552,572 | 5/1951 | Mikina | 241/92 X |
| 2,710,098 | 6/1955 | Tilton | . |
| 3,610,304 | 10/1971 | Popeil | 241/92 |
| 4,240,338 | 12/1980 | McClean | 241/92 X |

FOREIGN PATENT DOCUMENTS 1082587 6/1954 France .

Primary Examiner—Mark Rosenbaum
Attorney, Agent, or Firm—Fleit, Jacobson, Cohn & Price

[57] ABSTRACT

A sifting device consists of a mesh with a vertical wall and protrusions, which attach the device to the rim of a bowl of a food processor. An open-based cone is coaxial with a central rotatable hub and is provided with protuberances on the inner surface thereof. In operation, ingredients are placed in the device and protuberances engaged in turn with a projection, as the hub is rotated, so as to provide undulations of the mesh, thus tossing the ingredients in the device and introducing them into the bowl through the mesh.

6 Claims, 3 Drawing Figures

4,598,874

SIFTING DEVICE

This invention relates to a sifting device and in particular, though not exclusively, to such a device which may be used as an attachment for a food processor.

During baking, dry ingredients, such as flour, are generally required to be sifted before being mixed with other ingredients so as to remove lumps therefrom and to induce air thereinto, thus contributing to the baking of a higher quality product.

A substantial amount of the mixing of ingredients, including dry ingredients required to be sifted, is now usually carried out by a food processor. However, sifting devices, which have been provided hitherto, are usually hand-held and are not generaly considered to be convenient for use in conjunction with a food processor, because they may not only result in the spillage of the ingredients to be sifted, but also necessitate the removal of the lid of the bowl on the food processor, thus exposing the mixing ingredients within the bowl to a user of the processor.

It is therefore an object of the present invention to provide an improved sifting device, better adapted for use with a food processor than those that have been provided heretofore.

According to the invention there is provided a sifting device, arranged for attachment to a bowl of a food processor, consisting of a base which includes a mesh, the base being shaped so as to conform to the rim of the bowl and having a generally vertical wall extending upwards therefrom and around the periphery thereof, and including means for providing attachment of the device to the bowl and means for responding to motion of the drive member of the processor to apply undulations to at least the mesh when the device is attached to said bowl so that an ingredient placed within the device may be introduced into said bowl through the mesh.

Further according to the invention there is provided a sifting device, as set forth in the immediately preceding paragraph, arranged so as to act as a lid for said bowl.

The device is also preferably provided with a lug disposed on the wall thereof to activate a safety interlock, which would otherwise have been activated by the lid, thus allowing the motor of the processor to be switched on.

Figure 2:
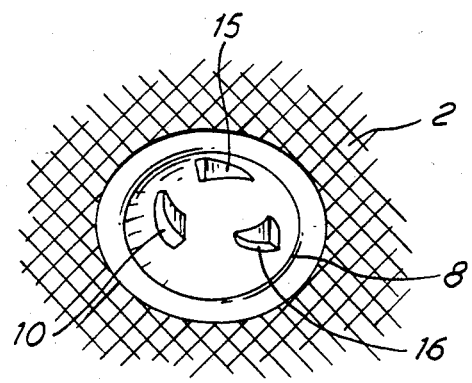
Figure 3:
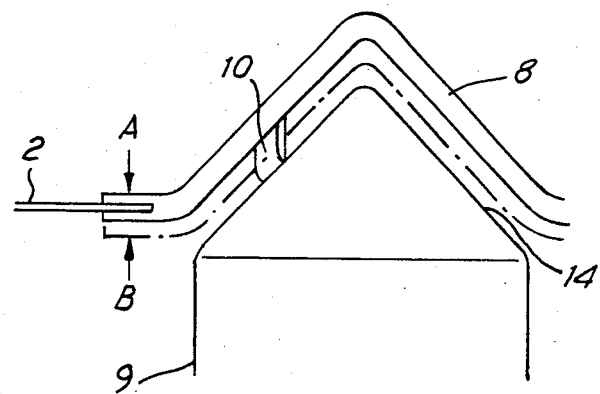

The invention will now be further described by way of example only with reference to the accompanying drawings wherein:

FIG. 1 shows a perspective view of a preferred embodiment of the invention in conjunction with a known food processor, FIG. 2 shows an enlarged view of part of the embodiment shown in FIG. 1, and FIG. 3 shows a schematic view of the operation of the embodiment shown.

Referring to FIG. 1, a sifting device, shown generally at 1, consists of a mesh 2 with an upwardly-extending vertical wall 3. Provided near the bottom of the wall 3 and around the rim of the mesh 2 are downwardly extending protrusions 4 and 5, which attach the sifting device 1 to the rim of a bowl 6 of a food processor 7.

An open-based cone 8 is provided at the centre of the mesh 2 and is arranged to be co-axial with a central hub 9 within the bowl 6 of the processor, so that, when the device 1 is attached to the rim of the bowl 6, up-standing projection 14 on the hub 9 is disposed within the open base of the cone 8. The central hub 9 may also have a whisk, beater, knife blade or other attachment mounted thereon to mix ingredients within the bowl.

Protuberances, one being shown at 10, are provided at spaced intervals around the inner surface of the cone 8, these protuberances being arranged so as to engage with projection 14 on the hub 9, when the sifting device 1 is attached to the rim of the bowl 6.

A lug 11 may also be provided near the bottom of the wall 3, so that, when the sifting device is correctly positioned over the bowl 6, the lug 11 can activate a safety interlock provided in the housing of the processor, which would otherwise have been activated by a lid for the bowl, thus allowing the motor of the processor 7 to be switched on, the speed thereof being controlled by user-selective buttons 13 on the processor 7. A locking lug 12 is also provided on the rim of the bowl 6.

FIG. 2 shows an enlarged view of the inside of the cone 8, indicating three protuberances 10, 15 and 16, respectively spaced around the inner surface of the cone 8.

In operation, the sifting device 1 is locked onto the rim of the bowl 6 by protrusions 4 and 5 engaging with locking lug 12, so that the device acts as a lid for the bowl 6. Lug 11 subsequently activates the safety interlock so that the motor of the processor 7 may be switched on.

Dry ingredients, such as flour, which are required to be sifted are placed within the wall 3 of the device 1. During activation of the processor, hub 9, and thus projection 14, are rotated at a required speed, projection 14 thus engaging, in turn as it rotates, with at least one of the protuberances 10, 15 and 16 on the inner surface of the cone 8 and then with an interval therebetween, thus providing up and down axial movement of the cone 8, as shown by arrows A and B in FIG. 3. This up and down movement of the cone 8 consequently provides undulations of the mesh 2, which is flexible, thus tossing the ingredients in the sifting device and introducing them into the bowl through the mesh, wherein the newly-sifted ingredients are mixed with other ingredients within the bowl.

The wall 3 is preferably relatively high to reduce the risk of any spillage of the ingredients within the sifting device 1 during tossing thereof by the undulating mesh 2.

A removeable cover may also be provided to further reduce the risk of any spillage of ingredients.

The sifting device is preferably manufactured from a plastics material, such as polypropylene, and the mesh is of a relatively flexible plastics material, such as nylon.

The mesh 2 may be supported by a series of radial spokes, each attached at one end to the cone 8 and at the other end to the rim of the mesh 2.

It can therefore be envisaged that the present invention provides a sifting device, which is substantially more convenient for use in conjunction with a food processor as an attachment therefor, because, not only does it act as a lid for the bowl of the processor, but it also substantially reduces the risk of spillage of ingredients therefrom.

I claim:

1. A food processor comprising:
a housing,
an electric motor accommodated in said housing,
a bowl, having a rim, for retaining foodstuff ingredients, support means supporting said bowl relative to said housing, a drive member, adapted to be driven for rotation by said motor, upstanding from said support means and extending into said bowl, and a sifting device removably attached to the rim of said bowl, said sifting device comprising a base portion, a mesh of flexible material in said base portion, a periphery of said base portion conforming to the rim of said bowl, an upstanding wall connected to said base portion and extending around said periphery, downwardly-extending protrusions removably attaching said base portion to said rim, an open-based member defining an inner surface, said member being connected to said mesh and located over said drive member, and spaced protuberances on said inner surface adapted to engage intermittently with said drive member during rotation thereof to impart undulatory movement to said mesh, whereby an ingredient of granular or powdery consistency placed in said device, is encouraged to pass through said mesh into said bowl.

2. A food processor as claimed in claim 1 wherein said bowl is provided with a locking device for locking said sifting device, when attached to the rim of the bowl.

3. A food processor as claimed in claim 1 and further including a safety interlock to prevent operation of said processor, and said sifting device includes means adapted to co-operate with said safety interlock to permit operation of said processor, when said safety device is attached to said bowl.

4. A food processor as claimed in claim 1 wherein said drive member is provided with an up-standing projection adapted to engage with said protuberances.

5. A food processor as claimed in claim 1 wherein said sifting device is provided with a removable cover.

6. A food processor as claimed in claim 1 wherein said mesh is made from a flexible plastics material, such as nylon.

* * * * *